United States Patent
Aoki et al.

(10) Patent No.: US 7,450,533 B2
(45) Date of Patent: Nov. 11, 2008

(54) WIRELESS TRANSMITTING DEVICE AND WIRELESS RECEIVING DEVICE

(75) Inventors: Tsuguhide Aoki, Kawasaki (JP); Ichiro Seto, Fuchu (JP); Kazumi Sato, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 384 days.

(21) Appl. No.: 11/132,376

(22) Filed: May 19, 2005

(65) Prior Publication Data
US 2006/0007891 A1    Jan. 12, 2006

(30) Foreign Application Priority Data
Jun. 10, 2004    (JP)    ............................. 2004-173138

(51) Int. Cl.
*H04B 7/00* (2006.01)
(52) U.S. Cl. .................. 370/310; 370/334; 370/208; 370/342; 370/343; 370/338; 455/136; 455/138; 455/240.1; 455/250.1; 375/299; 375/346; 375/345; 375/260; 375/267
(58) Field of Classification Search ................ 370/334, 370/208, 342, 343, 338, 348, 349; 455/240.1, 455/136, 250.1, 138, 67.13, 277.1, 277.2, 455/65, 101, 103, 59; 375/345, 299, 347, 375/367, 267, 260, 346; 342/457
See application file for complete search history.

(56) References Cited

U.S. PATENT DOCUMENTS

| | | | | |
|---|---|---|---|---|
| 6,034,635 A * | 3/2000 | Gilhousen | ................... | 342/457 |
| 6,922,549 B2 * | 7/2005 | Lyons et al. | ............. | 455/67.13 |
| 7,072,427 B2 * | 7/2006 | Rawlins et al. | .............. | 375/346 |
| 7,085,335 B2 * | 8/2006 | Rawlins et al. | .............. | 375/346 |
| 7,257,078 B2 * | 8/2007 | Liu et al. | .................... | 370/208 |
| 7,277,685 B2 * | 10/2007 | Liu et al. | ................. | 455/240.1 |
| 2004/0151146 A1 * | 8/2004 | Hammerschmidt | ......... | 370/338 |
| 2004/0209582 A1 * | 10/2004 | Liu et al. | .................... | 455/136 |
| 2005/0163236 A1 * | 7/2005 | Hammerschmidt et al. | . | 375/260 |
| 2005/0220208 A1 * | 10/2005 | Aoki | .......................... | 375/267 |
| 2005/0286474 A1 * | 12/2005 | van Zelst et al. | ............ | 370/334 |

(Continued)

FOREIGN PATENT DOCUMENTS

EP    1548958 A2 *    6/2005

OTHER PUBLICATIONS

Jan Boer, et al., 'Backwards Compatibility- How to Make a MIMO-OFDM System backwards Compatible and Coexistence with 11 a/g at the Link Level', IEEE 802.11-03/714r0, Sep. 2003, Slides 1-26.

(Continued)

*Primary Examiner*—Rafael Pérez-Gutiérrez
*Assistant Examiner*—Joseph Arevalo
(74) *Attorney, Agent, or Firm*—Oblon, Spivak, McClelland, Maier & Neustadt, P.C.

(57) ABSTRACT

A wireless transmitting device includes a first and a second antennas, a first and a second transmitters connected to the first and the second antenna, respectively, signal provide unit provide a short preamble sequence, a first and a second signal fields to the first transmitter, and provide an AGC preamble sequence, a data and a long-preamble sequence to estimate a channel response to the first and the second transmitters, and a controller to power on the transmitters at different timings, respectively.

9 Claims, 4 Drawing Sheets

U.S. PATENT DOCUMENTS

2006/0007891 A1* 1/2006 Aoki et al. .................. 370/334
2006/0034389 A1* 2/2006 Aoki .......................... 375/299

OTHER PUBLICATIONS

U.S. Appl. No. 11/087,601, filed Mar. 24, 2005, Tsuguhide Aoki.
U.S. Appl. No. 11/016,808, filed Dec. 21, 2004, Ichiro Seto, et al.
U.S. Appl. No. 11/132,279, filed May 19, 2005, Aoki.
U.S. Appl. No. 11/132,376, filed May 19, 2005, Aoki, et al.
U.S. Appl. No. 11/201,385, filed Aug. 11, 2005, Aoki.
Tsuguhide Aoki, et al., "New preamble structure for AGC in a MIMO-OFDM system", IEEE 802.11-04/046rl, Corporate R&D center, Toshiba corporation, Jan. 2004, pp. 1-13.
U.S. Appl. No. 11/873,109, Oct. 16, 2007, Sato.
U.S. Appl. No. 12/060,647, filed Apr. 1, 2008, Seto, et al.

* cited by examiner

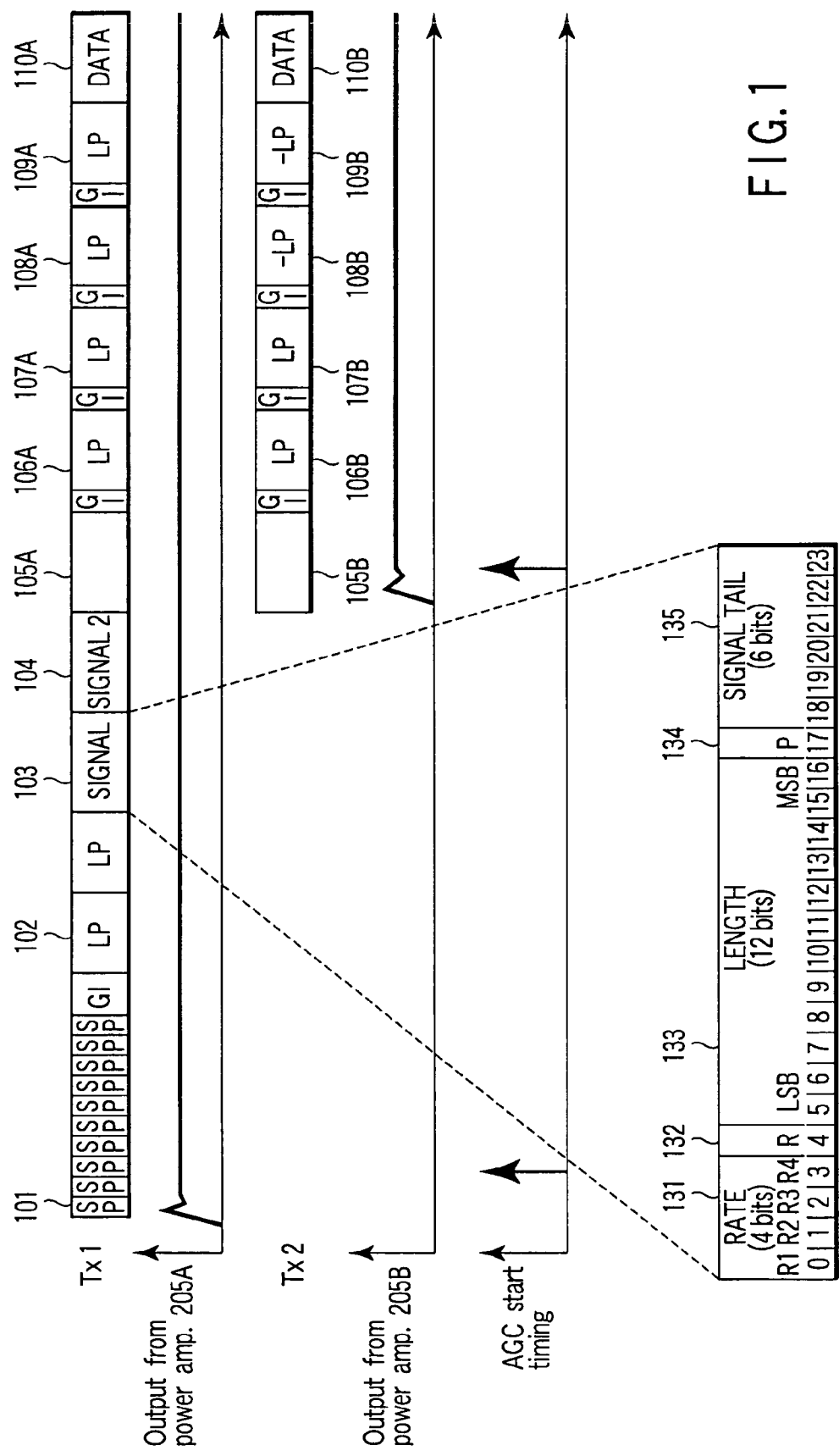
F I G. 1

WIRELESS TRANSMITTING DEVICE AND WIRELESS RECEIVING DEVICE

CROSS-REFERENCE TO RELATED APPLICATIONS

This application is based upon and claims the benefit of priority from prior Japanese Patent Application No. 2004-173138, filed Jun. 10, 2004, the entire contents of which are incorporated herein by reference.

BACKGROUND OF THE INVENTION

1. Field of the Invention

The invention relates to a wireless transmitting device and a method for transmitting by using a wireless packet including a preamble signal.

2. Description of the Related Art

The Institute of Electrical and Electronics Engineers (IEEE) is now defining a wireless LAN standard called IEEE 802.11n, which aims to achieve a high throughput of 100 Mbps or more. It is very possible that IEEE 802.11n will employ a technique, called multi-input multi-output (MIMO), for using a plurality of antennas in a transmitter and receiver. IEEE 802.11n is required to coexist with the standard IEEE 802.11a where OFDM (Orthogonal Frequency Division Multiplex) is used. So, it is required that IEEE 802.11n wireless transmitting device and receiving device have so called backwards compatibility.

A proposal presented by Jan Boer et al. in "Backwards Compatibility", IEEE 802.11-03/714r0, introduces a preamble of wireless packet for MIMO. In this proposal, a short-preamble sequence used for time synchronization, frequency synchronization and automatic gain control (AGC), a long-preamble sequence used to estimate a channel impulse response, a signal field indicating a modulation scheme used in the wireless packet, and another signal field for IEEE 802.11n are firstly transmitted from a single particular transmit antenna. Subsequently, long-preamble sequences are transmitted from the other three transmit antennas. After finishing the transmission of the preamble, transmission data is transmitted from all the antennas.

From the short-preamble to the first signal field, the proposed preamble is identical to the preamble stipulated in IEEE 802.11a where single transmit antenna is assumed. Therefore, when wireless receiving devices that conform to IEEE 802.11a receive a wireless packet containing the Boer's proposed preamble, they recognize that the packet is based on IEEE 802.11a. Thus, the proposed preamble conforming to both IEEE 802.11a and IEEE 802.11n enables IEEE 802.11a and IEEE 802.11n to coexist.

Generally, a wireless transmitting device uses a power amplifier for amplifying a transmission signal. Right after the power amplifier is powered on, it generates distortions in an output signal. The power amplifier needs a certain extent of time until the output signal achieve a specified level after it is powered on. A long-preamble sequence included in the wireless packet so as to estimate a channel response is extremely degrades receiving performance of the wireless transmitting device if the long-preamble sequence is not received in a low distortion state. Therefore, it is required to transmit the long-preamble sequence so as to avoid the distortion thereof as much as possible, however, Jan Boer, et al., have not disclosed any measures therefore.

BRIEF SUMMARY OF THE INVENTION

An object of the invention is to provide a wireless transmitting device and a method capable of estimating a channel response on a receiving side by preventing a signal especially used for estimating the channel response being transmitted with distortions when a plurality of transmission antennas conduct transmission like a multi-input/multi-output (MIMO).

The first aspect of the present invention provides a wireless transmitting device for use in communication with a wireless receiving device, comprises a first antenna; at least one second antenna; a first and a second transmitter connected to the first antenna and the second antenna, respectively; a signal provide unit configured to provide a short preamble sequence, a first signal field and a second signal field to the first transmitter, and provide an automatic gain control (AGC) preamble sequence, a data and a long-preamble sequence to estimate a channel response, to the first transmitter and the second transmitter; and a controller to power on the first transmitter and the second transmitter at different timings, respectively.

The second aspect of the present invention provides a wireless transmitting device for use in communication with a wireless receiving device, comprises a first antenna; at least one second antenna; a first and a second transmitter connected to the first antenna and the second antenna, respectively; a signal provide unit configured to provide a short preamble sequence, a first signal field and a second signal field to the first transmitter, and provide an automatic gain control (AGC) preamble sequence, and a long-preamble sequence to estimate data and a channel response, to the first transmitter and the second transmitter; and a controller to power on the first transmitter in time with transmission of the short preamble sequence from the first antenna and power on the second transmitter during transmission of the AGC preamble sequence.

The third aspect of the present invention provides a wireless transmitting method comprises transmitting a short preamble sequence, a first signal field and a second signal field from a first antenna by using a first transmitter; transmitting an automatic gain control (AGC) preamble sequence, a data and a long-preamble sequence to estimate a channel response, from the first antenna and the second antenna after transmission of the second signal field from the first antenna by using the first transmitter and a second transmitter; powering on the first transmitter in time with transmission of the short preamble sequence from the first antenna; and powering on the second transmitter after transmission of the second signal field from the first antenna.

The fourth aspect of the present invention provides a wireless transmitting method comprises transmitting a short preamble sequence, a first signal field and a second signal field from a first antenna by using a first transmitter; transmitting an automatic gain control (AGC) preamble sequence, a data and a long-preamble sequence to estimate a channel response, from the first antenna and the second antenna after transmission of the second signal field from the first antenna by using the first transmitter and a second transmitter; powering on the first transmitter in time with transmission of the short preamble sequence from the first antenna; and powering on the second transmitter after transmission of the second signal field from the first antenna.

BRIEF DESCRIPTION OF THE SEVERAL VIEWS OF THE DRAWING

FIG. 1 is a view showing a wireless packet including a preamble signal, variations in an output from a power amplifier and automatic gain control (AGC) start timing on a receiving side according to an embodiment of the invention;

FIG. 3 is a view showing a wireless packet based on the IEEE 802.11a;

DETAILED DESCRIPTION OF THE INVENTION

Embodiments of the invention will be described in detail with reference to the accompanying drawings.

FIG. 1 shows a format for a wireless packet employed in a first embodiment of the invention. This format is a physical layer protocol data unit format for the MIMO mode and provides interoperability and coexistence with IEEE802.11a wireless stations.

As seen from FIG. 1, a preamble includes a physical layer convergence protocol (PLCP) signal transmitted from an antenna Tx1. The PLCP signal includes a short-preamble sequence 101, first long-preamble sequence 102, first signal field (SIGNAL) 103 and second signal field (SIGNAL 2) 104. The short-preamble sequence 101 contains several unit preambles SP. The long-preamble sequence 102 contains the unit preambles LP having respective predetermined lengths. The unit preambles of LP are longer than those of SP.

The short-preamble sequence 101, first long-preamble sequence 102 and first signal field 103 conform to IEEE 802.11a, while the second signal field 104 is necessary for the new wireless LAN standard IEEE 802.11n. First signal field 103 conforming to IEEE 802.11a may be called "legacy signal field". Since the second signal field 104 is provided for new high throughput wireless LAN standard, it may be called "high throughput signal field". A guard interval GI is inserted between the short-preamble sequence 101 and the long-preamble sequence 102.

After the PLCP signal, AGC preambles 105A and 105B that are transmitted in parallel from a plurality of antennas Tx1 and Tx2 are positioned. The AGC preambles 105A and 105B are transmitted simultaneously from a plurality of antennas Tx1 and Tx2. The AGC preambles 105A and 105B are used to enable the receiving device to perform fine AGC when performing MIMO communication. These preambles are unique to perform fine tune the AGC for reception of MIMO mode in accordance with IEEE802.11n. Therefore, the AGC preambles 105A and 105B may be called "high throughput short trainings field (HTS)". On the other hand, since the short-preamble sequence 101 conforms to IEEE 802.11a, being used for coarse AGC operation, it may be called "legacy short training field".

Figure 2:
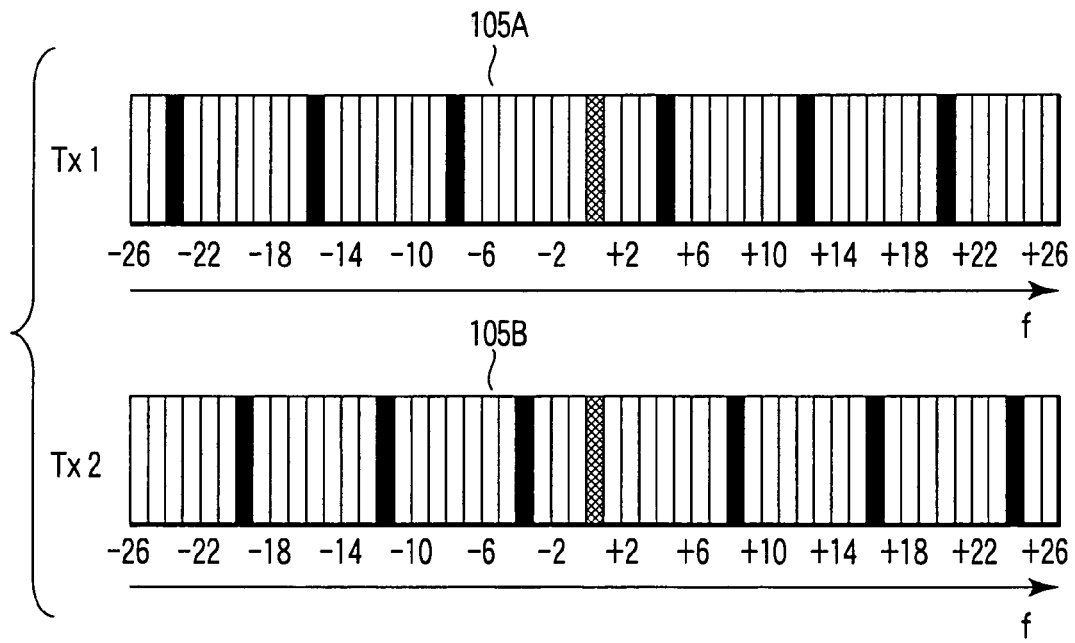
FIG. 2 is a view showing subcarrier arrangements of AGC preambles in FIG. 1.

A second long-preamble sequence 106A-109A and 103B-109B are arranged after the AGC preambles 105A and 105B, respectively. In this embodiment, sequence shown in FIG. 2 is used as the AGC preambles 105A and 105B. FIG. 2 shows subcarrier arrangements in the frequency domains of the AGC preambles 105A and 105B. Subcarriers indicated in black in FIG. 2 indicate that the subcarriers have values, for example, 1 or −1, in the AGC preambles 105A and 105B, and subcarriers indicated in white in FIG. 2 indicate that the subcarriers have zero values in the AGC preambles 105A and 105B. In FIG. 2, there are 52 subcarriers except for zero subcarriers indicated at centers with hatched lines.

Each transmission antenna Tx1 and Tx2 uses six subcarriers (indicated in black), respectively, and the number of subcarriers used at the antennas Tx1 and Tx2 is designed to become twelve in total in this example. The number of subcarriers used in the short preamble sequence 101 is also twelve and the subcarriers used therein are the same as those used in the AGC preambles 105A and 105B in this example. It is possible that the number of subcarriers used in the short preamble sequence 101 is not same as those used in the AGC preambles 105A and 105B. In this example, the number of subcarriers used in the short preamble sequence 101 is also twelve and the subcarriers used therein are the same as those used in the AGC preambles 105A and 105B. Accordingly, if the subcarriers in the frequency domains shown in FIG. 2 are converted into waveforms in the time domains, periods of the AGC preambles 105A and 105B become same as that of the short preamble sequence 101.

If the subcarriers used in the short preamble sequence 101 is the same as those used in the AGC preambles 105A and 105B, periods of the AGC preambles 105A and 105B become different length of that of the short preamble sequence 101.

Although the case that the number of the transmission antennas is two is explained in this embodiment, the number of the transmission antennas is not limited to this case. For example, in the case that the number of the transmission antennas is three, each transmission antenna uses four subcarriers, respectively.

A guard interval GI is inserted between each pair of adjacent ones of the unit preambles LP that form the second long-preamble sequences 106A to 109A and 106B to 109B. The second long-preamble sequences 106A to 109A and 106B to 109B are in the orthogonal relationship in this embodiment. But, they are not limited in the orthogonal relationship. The number of unit preambles LP 106-109 for each transmit antenna is equal to the number of transmit antennas in MIMO mode. In order to distinguish between two kinds of long-preamble sequences, first long-preamble sequence 102 conforming to IEEE 802.11a may be called "legacy long training field". Since the second long-preambles sequences 106-109 are provided for new high throughput wireless LAN standard, it may be called "high throughput long training field".

After each of the second long-preamble sequences 106A to 109A and 106B to 109B, a field for transmission data (DATA) 110A and 110B transmitted from the antennas Tx1 and Tx2, respectively, is positioned. The second long-preamble sequences 106A to 109A and 106B to 109B are transmitted simultaneously from a plurality of antennas Tx1 and Tx2 respectively.

Before the first signal field 103, the second signal field 104 will be described. The second signal field 104 contains identification information indicating that the radio packet shown in FIG. 1 conforms to IEEE 802.11n different from IEEE 802.11a. In other words, the second signal field 104 indicates that the second long-preamble sequences 106A to 109A and 106B to 109B are to be received next, and that the number of symbols included in the second long-preamble sequences. The field 104 also indicates that a modulation and coding scheme (MCS) which is the combination of the modulation and coding schemes of the transmission data 110A and 110B.

The coding scheme indicates the coding rate of a convolution code as an error correction signal.

The first signal field 103 will now be described in detail. The field 103 contains information indicating the modulation scheme and radio packet length of the following transmission data 110A and 110B. As mentioned above, in the radio communication preamble signal shown in FIG. 1, the PLCP signal zone, in particular, the radio packet zone ranging from the short-preamble sequence 101 to the first signal field 103, conforms to IEEE 802.11a.

Figure 3:
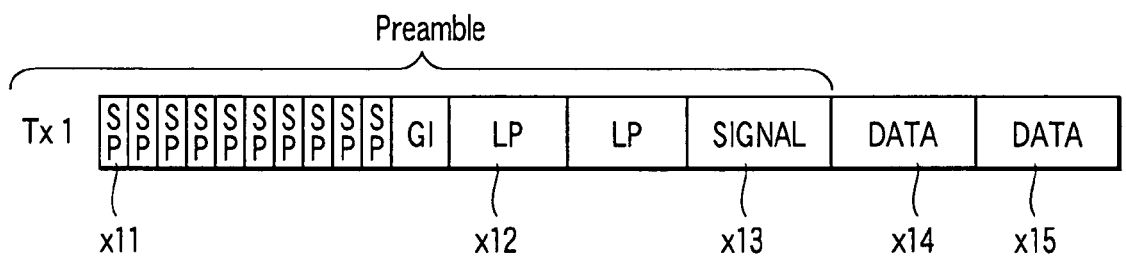

FIG. 3 shows a wireless packet based on IEEE 802.11a. In this case, from a single transmission antenna Tx1, a short-preamble sequence x11 used for time synchronization, frequency synchronization and a first AGC, a long-preamble sequence x12 for channel response estimation, and a signal field x13 including a field indicating the modulation scheme and length of the wireless packet are transmitted. After that, transmission data items x14 and x15 are transmitted from the antenna Tx1.

The first signal field 103 shown in FIG. 1 is similar to the signal field x13 of the wireless packet based on IEEE 802.11a and shown in FIG. 3. As shown in detail in FIG. 1, the first signal field 103 comprises a rate section (RATE) 131 indicating a modulation and coding Scheme (MCS) of a data signal in a wireless packet based on IEEE 802.11a, a reserve bit (R) 132 reserved for future standard extension, and a packet length section (LENGTH) 133 indicating the length of the wireless packet. The field 103 also comprises a parity section (P) 134 that performs parity checking of information ranging from the rate section 131 to the packet length section 133, and a signal tail section (SIGNAL TAIL) 135 for terminating a convolution code. These sections are combined by OFDM multiplexing and transmitted from the transmission antenna Tx1.

Accordingly, if the wireless device conforms to IEEE 802.11a, it can perform normal receiving operations within the wireless packet zone indicated by the packet length section 133. Namely, the wireless packet is protected from being destroyed by another wireless transmission device, which conforms to IEEE 802.11a, starting transmission within the signal zone following the first signal field 103.

The reserve bit 132 is not necessary for wireless device conforming to IEEE 802.11a and hence ignored at the receiver device. The embodiment controls, using the reserve bit 132, the operation of a wireless device based on a standard other than IEEE 802.11a, i.e., for example, IEEE 802.11n. Specifically, for example, the reserve bit 132 (a) beforehand notifies the transmission of the AGC preambles 105A and 105B, and (b) indicates the transmission of a wireless packet corresponding to IEEE 802.11n shown in FIG. 1. Further, the reserve bit 132 (c) beforehand notifies the transmission of the AGC preambles 105A and 105B and data items 110A and 110B performed by a plurality of transmission antennas Tx1 and Tx2, and (d) notifies the transmission of the second signal field 104.

The notification (a) includes indirect notification of the transmission of the AGC preambles 105A and 105B by beforehand notifying the transmission of the second signal field 104. The wireless packet corresponding to IEEE 802.11n, recited in (b), indicates a wireless packet that includes the short-preamble sequence 101, first long-preamble sequence 102, first signal field 103, second signal field 104, AGC preambles 105A and 105B, second long-preamble sequences 106A to 109A and 106B to 109B, and data items 110A and 110B. That is, the wireless packet includes signals transmitted from a plurality of transmission antennas and combined by multiplexing using MIMO.

If transmission is performed with the reserve bit 132 set to, for example, "1", a wireless device conforming to IEEE 802.11n receives and demodulates the reserve bit 132, thereby recognizing the reception of a wireless packet corresponding to IEEE 802.11n. More specifically, the reserve bit 132 can indicate the reception of the wireless packet shown in FIG. 1, and indicate that the second signal field and AGC preambles 105A and 105B will be received after the reserve bit 132.

It is required for timing of AGC on the receiving side to respond receiving of a second signal field 104 and of the AGC preambles 105A and 105B.

Thereafter, the wireless transmitting device according to the embodiment of the invention for transmitting the wireless packets shown in FIG. 1 and FIG. 2 will be explained by referring to FIG. 4.

At first, a timing controller 201 with a transmission command received thereby outputs a read command to a baseband-signal processing unit 202. The baseband-signal processing unit 202 with the read command received thereby reads the preamble shown in FIG. 1 by referring to a memory 203. The baseband-signal processing unit 202 constitutes the whole of the wireless packet shown in FIG. 1 by modulating and encoding transmission data transmitted from further high order layer.

A baseband-signal of the wireless packets output from the baseband-signal processing unit 202 are respectively transferred to wireless transmission units 204A and 204B for the antennas Tx1 and Tx2 shown in FIG. 1, prescribed processing (for example, up conversion, filtering) is performed therefore here, then, transferred to power amplifiers 205A and 205B. The power amplifiers 205A and 205B perform power amplification to signals input from the wireless transmission units 204A and 204B to supply the amplified outputs to the antennas Tx1 and Tx2, respectively. As a result, the antennas Tx1 and Tx2 transmit the wireless packets shown in FIG. 1, respectively.

Figure 4:
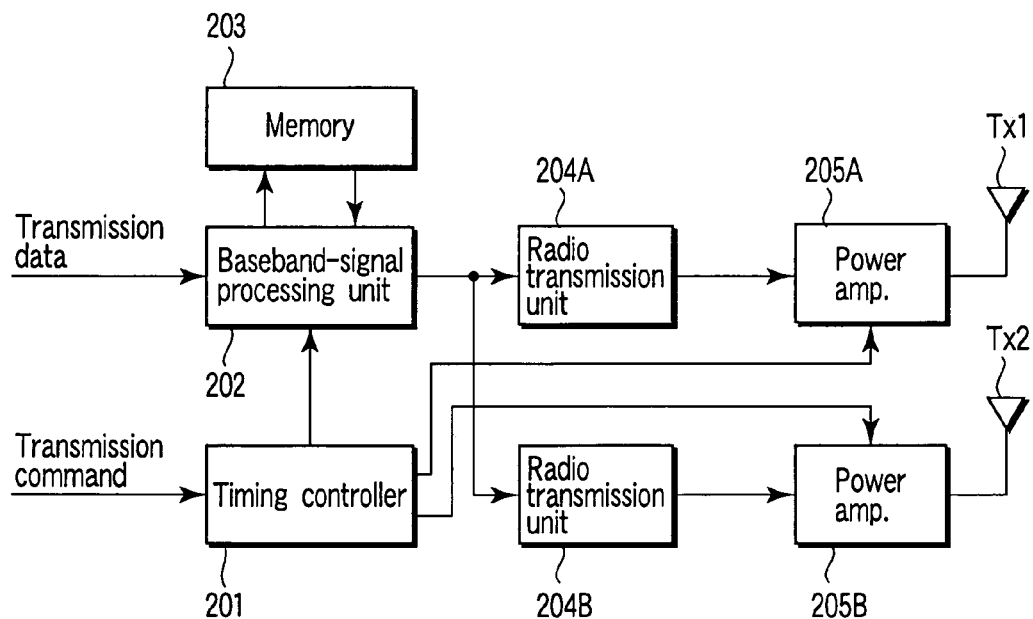
FIG. 4 is a block diagram of a wireless transmitting device according to the embodiment of the invention.

In the embodiment, the transmission antenna Tx1 in FIG. 4 transmits PLCP signals in a range from the 2.0 short preamble sequence 101 up to a first long-preamble sequence 102, a first signal field 103 and a second signal field 104. The transmission antennas Tx1 and Tx2 in FIG. 4 transmit the AGC preambles 105A and 105B, the second long-preamble sequence 106A-109A and 106B-109B and data 110A and 110B.

The timing controller 201 outputs a command to the power amplifier 205A just before the transmission of the short preamble sequence 101 and powers on the power amplifier 205A. The timing controller 201 also powers on the power amplifier 205B in time with transmission of the AGC preambles 105A and 105B. In the embodiment shown in FIG. 1, just after the signal of the AGC preambles 105 is arrived at the power amplifier 205B, the timing controller 201 powers on the power amplifier 205B.

FIG. 1 schematically shows variations in output level of the power amplifiers 205A and 505B with powering on them. That is, the output level of the power amplifier 205A for the antenna Tx1 remains in low level until the antenna Tx1 transmits the short preamble sequence 101, and rises to a high level almost the same time of the transmission of the short preamble sequence 101. On the other hand, the output level of the power amplifier 205B for the antenna Tx2 is switched from the low level to the high level in time with transmission of the AGC preambles 105A and 105B.

The timing to switch the output level of the power amplifier 205A for the antenna Tx1 from the low level to the high level can be advanced or delayed in comparison with the timing shown in FIG. 1. Specifically, there is no problem if the distortion of the output signal from the power amplifier 205A is in an extent not to affect frame detection and the first AGC using the short preamble sequence 101 mentioned later.

In contrary, in the case that the power amplifier 205B is powered on before transmission of the AGC preamble 105A, specifically, during the transmission of the second signal field 104, there is a possibility for the power amplifier 205B to cause distortions of the transmission signal from the antenna Tx1 because a large current flows in a wireless circuit. Accordingly, the power-on timing for the power amplifier 205B is optimal after transmitting the second signal field 101, in other words, during transmission of the AGC preambles 105A and 105S, and further preferably, it is preferable to set the timing so as not to affect a second AGC using the AGC preambles 105A and 105B.

Figure 5:
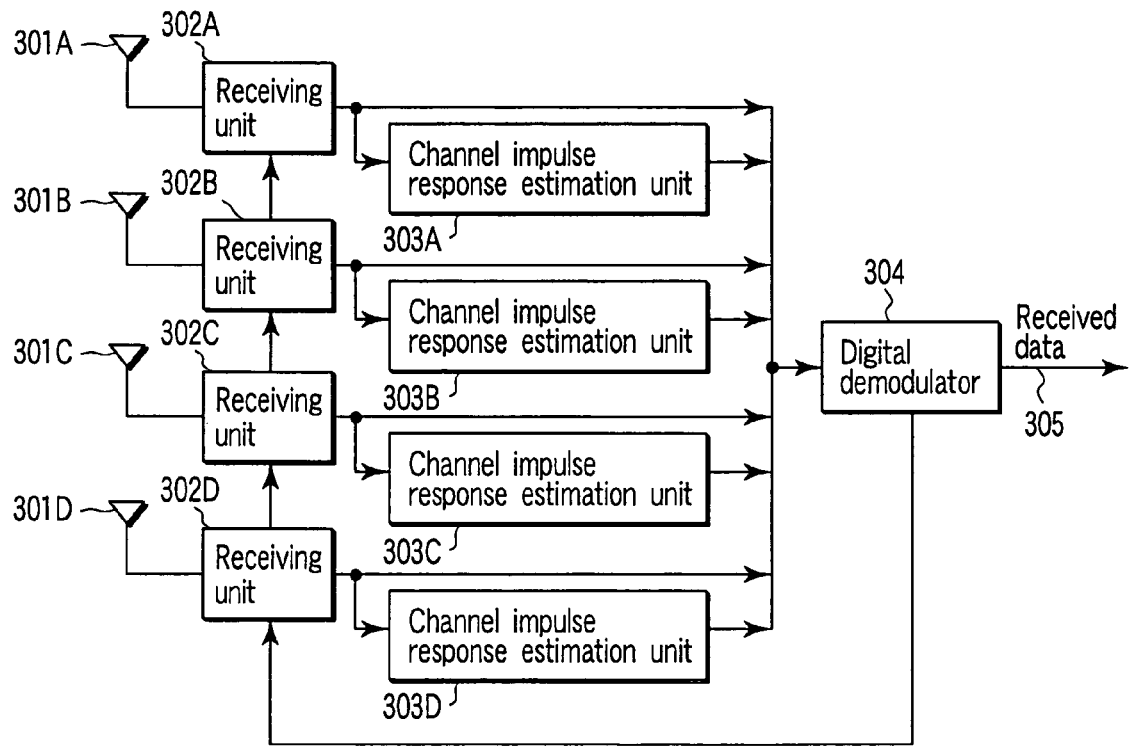
FIG. 5 is a block diagram of the wireless receiving device according to the embodiment of the invention.

In the wireless receiving device shown in FIG. 5, a plurality of receiving antennas 301A to 301D receive RF signals transmitted from the wireless transmitting device shown in FIG. 3. The wireless receiving device may have one receiving antenna or multiple receiving antennas. The RF signals received by the receiving antennas 301A to 301D are sent to receiving units 302A to 302D, respectively. The receiving units 302A to 302D each perform various types of receiving processing, such as frequency conversion (down-conversion) from the RF band to BB (baseband), automatic gain control (AGC), analog-to-digital conversion, etc., thereby generating a baseband signal.

The baseband signals from the receiving units 302A to 302D are sent to channel impulse response estimation units 303A to 303D and digital demodulator 304. These units 303A to 303D estimate the impulse responses of the respective propagation paths between the wireless transmitting device of FIG. 4 and the wireless receiving device of FIG. 5. The channel impulse response estimation units 303A to 303D will be described later in detail. The digital demodulator 304 demodulates the baseband signals based on the estimated channel impulse response provided by units 303A to 303D, thereby generating received data 305 corresponding to the transmission data shown in FIG. 4.

Figure 6:
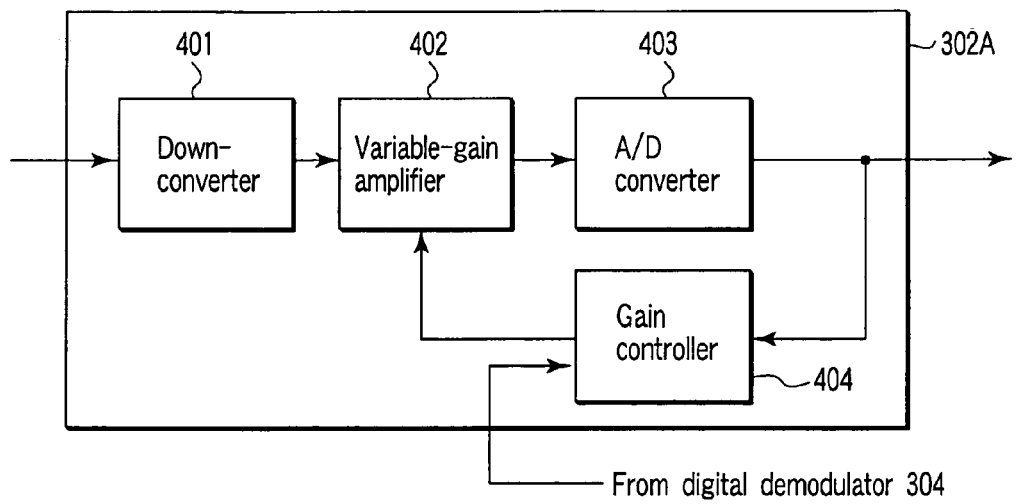
FIG. 6 is a block diagram showing a specific example of a receiving unit in FIG. 5.

More specifically, the digital demodulator 304 has an equalizer of the channel impulse response at its input section. The equalizer performs equalization for correcting the received signal distorted in the propagation path, based on the estimated channel impulse response. The digital demodulator 304 also demodulates the equalized signal at appropriate timing determined by the time synchronization, thereby reproducing data. The receiving units 302A to 302D shown in FIG. 5 will now be described. FIG. 6 shows the configuration of the receiving unit 302A in detail. Since the other receiving units 302B to 302D have the same configuration as the unit 302A, only the receiving unit 302A will be described. The RF received signal received by the receiving antenna 301A is down-converted by a down-converter 401 into a baseband signal. At this time, The RF signal may be directly converted into a baseband signal, or may be firstly converted into an intermediate frequency (IF) signal and then into a baseband signal.

The baseband signal generated by the down-converter 401 is sent to a variable gain amplifier 402, where it is subjected to perform AGC, i.e., signal level adjustment. The signal output from the variable gain amplifier 402 is sampled and quantized by an A/D converter 403. The digital signal output from the A/D converter 403 is sent to the outside of the receiving unit 302 and to a gain controller 404. The gain controller 404 performs gain calculation based on the digital signal output from the A/D converter 403, and controls the gain of the variable gain amplifier 402. The specific procedure for the gain control will be described later.

The operation of the wireless receiving device shown in FIG. 5 and FIG. 6 executed for receiving the wireless packet including the preamble whose format is shown in FIG. 1 is as follows. Firstly, the wireless receiving device receives a short-preamble sequence 101 transmitted from the transmit antenna Tx1 of FIG. 4, and then performs packet edge detection, time synchronization, auto frequency control (AFC) and AGC, using a baseband signal corresponding to the short-preamble sequence 101. AFC is also called frequency synchronization. Packet edge detection, time synchronization and AFC can be performed using known techniques, therefore no description will be given thereof. Only AGC will be explained below.

The baseband signal corresponding to the short-preamble sequence 101 is amplified by the variable gain amplifier 402 in accordance with a predetermined initial gain value. The signal output from the variable gain amplifier 402 is input to the gain controller 404 via the A/D converter 403. The gain controller 404 calculates a gain from the level of the received signal corresponding to the short-preamble sequence 101, which is acquired after A/D conversion, and controls the gain of the variable gain amplifier 402 in accordance with the calculated gain.

Assume here that the level of the baseband signal corresponding to the short-preamble sequence 101, which is acquired before A/D conversion, is X. If level X is high, the baseband signal input to the A/D converter 403 exceeds the upper limit of the input dynamic range of the A/D converter 403. As a result, the signal (digital signal) output from the A/D converter 403 is saturated and degraded the quality of signal reception. On the other hand, if level X is extremely low, the signal output from the A/D converter 402 (i.e., the digital signal acquired by A/D conversion) suffers a severe quantization error. Thus, when level X L is very high or low, the A/D converter 403 cannot perform appropriate conversion, thereby significantly degrading the quality of signal reception.

To overcome this problem, the gain controller 404 controls the gain of the variable gain amplifier 402 so that the level X of the baseband signal corresponding to the short-preamble sequence 101, is adjusted to a target value Z. If the input baseband signal has such a very high level as makes the output of the A/D converter 403 limited to its upper limit level, or if it has a very low level, the gain of the variable gain amplifier 402 may not appropriately be controlled by one control process. In this case, gain control is performed repeatedly. As a result, the level of the baseband signal input to the A/D converter 403 can be adjusted to a value that falls within the input dynamic range of the A/D converter 403. Thus, the gain of the variable gain amplifier 402 is appropriately controlled using the baseband signal corresponding to the short-preamble sequence 101, thereby performing appropriate A/D conversion to avoid a reduction in the quality of signal reception.

In the above-described embodiment, the reception level needed for calculating the gain of the variable gain amplifier 402 is measured using a digital signal output from the A/D converter 403. However, such level measurement can be executed using an analog signal acquired before A/D conversion. Furthermore, the reception level may be measured in the IF band or RF band, instead of BB.

Since the power amplifier 205A is powered on in time with transmission of the sort preamble sequence 101, distortions are generated in a first half of the short preamble sequence 101. However, the first half of the short preamble sequence 101 is used for detection of the wireless packet and the AGC on the receiving side, so that no problem occurs if a quantity of distortions is generated in the first half of the short preamble sequence 101.

The AGC setting is conducted repeatedly. Since a second half of the short preamble sequence 101 can correctly conduct the AGC by using signals without distortions owing to affection of power-on, the occurrence of the distortions in the first half of the short preamble sequence 101 does not cause any specific trouble against the AGC.

The wireless receiving device receives a first long-preamble sequence 102 transmitted from the transmit antenna Tx1, and performs the estimation of channel impulse response, i.e., estimates the response (frequency transfer function) of the propagation path between the wireless transmitting device to the wireless receiving device, using a baseband signal corresponding to the long-preamble sequence 102. Since the signal transmitted from the transmit antenna Tx1 has already been subjected to AGC as described above, the level of an input to the A/D converter 403 is appropriately adjusted when the estimation of channel impulse response is performed. Accordingly, concerning the signal transmitted from the transmit antenna Tx1, a highly accurate digital signal is acquired from the A/D converter 403. The estimation of channel impulse can be performed accurately with the acquired digital signal.

The wireless receiving device receives a first signal field 103 transmitted from the transmit antenna Tx1, and demodulates a baseband signal corresponding to the first signal field 103, using the digital demodulator 304 and the above-mentioned channel estimation result. As shown in FIG. 1, the first signal field 103 contains the rate section 131 indicating the MCS of a data signal following preamble data, and the packet length section 133 indicating the length of the wireless packet. In the wireless packet zone recognized from the packet length section 133 of the first signal field 103, the wireless receiving device causes the digital demodulator 304 to continue decoding processing.

Figure 7:
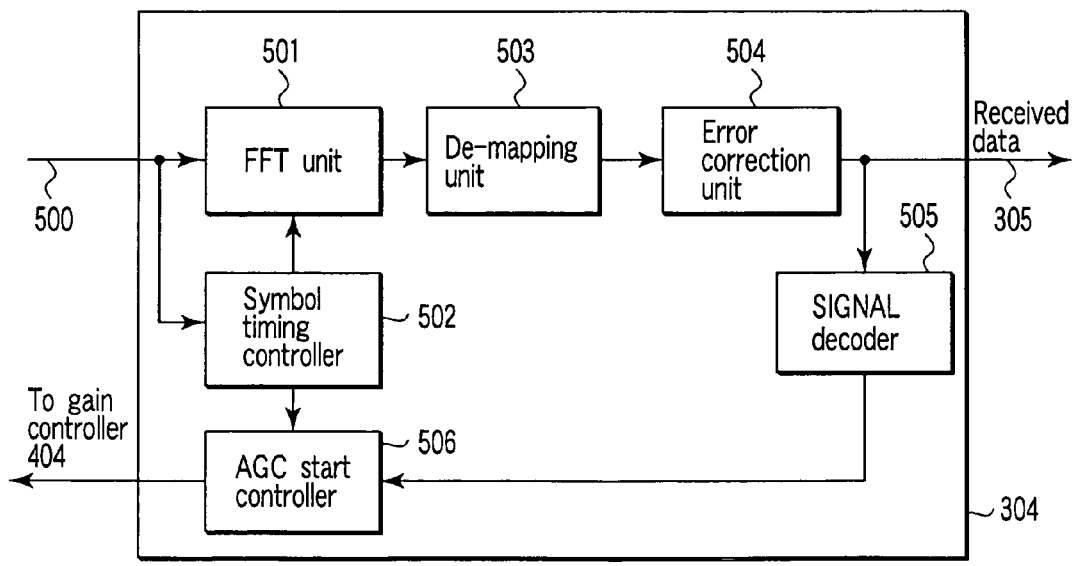
FIG. 7 is a block diagram showing a specific example of a digital demodulator in FIG. 5.

Referring to FIG. 7, the digital demodulator 304 shown in FIG. 5 will be described in detail. The digital demodulator 304 receives signals 500 from the receiving units 302A to 302D shown in FIG. 5. The digital demodulator 304 comprises a fast Fourier transform (FFT) unit 501, symbol timing controller 502, de-mapping unit 503, error correction unit 504, signal decoder 505 and AGC start controller 506.

The symbol timing controller 502 performs symbol synchronization included in timing synchronization, using the input short-preamble sequence 101, long-preamble sequence 102, etc. Specifically, the end of each symbol in the wireless packet shown in FIG. 1 is recognized. Since symbol synchronization is performed by a known method, no detailed description will be given of the method.

The FFT unit 501 performs FFT on the input signal 500 in accordance with the timing recognized by the symbol timing controller 502, thereby performing channel response estimation using the first long-preamble sequence 102. Propagation path estimation is also a known technique, therefore no description will be given thereof.

After that, the FFT unit 501 performs FFT on the input signal 500 in synchronism with the first signal field 103. The output of the FFT unit 501 is input to the error correction unit 504 after it is converted into a binary-value sequence by the de-mapping unit 503. The output of the error correction unit 504 is output as received data 305 from the digital demodulator 304 to the signal decoder 505. Alternatively, the output of the de-mapping unit 503 can be directly input to the signal decoder 505, without using the error correction unit.

The signal decoder 505 is provided for decoding the first signal field 103. When the signal decoder 505 decodes the reserve bit 132 in the first signal field 103 and detects that it is a preset value, e.g. "1", it recognizes that the AGC preambles 105A and 105B will be received soon, and informs the AGC start controller 506 of this, i.e., a previous notice of reception of the AGC preambles. Upon receiving the previous notice, the AGC start controller 506 supplies an AGC start command to the gain controller 404 shown in FIG. 6, thereby causing the gain controller 404 to start gain control.

After receiving the second signal field 104 from the transmission antenna Tx1, the wireless receiving device receives the AGC preambles 105A and 105B from the transmission antennas Tx1 and Tx2. The AGC preambles 105A and 105B are transmitted from the transmission antenna Tx1 that has transmitted so far the previous signals, and from the transmission antenna Tx2 that has not yet transmitted any signals. Accordingly, the AGC preambles 105A and 105B are received with different received-signal levels, which differs from the signals (first short-preamble sequence 101, second long-preamble sequence 102, first signal 103 and second signal 104) transmitted with the almost same received-signal level from the transmission antenna Tx1.

At this time, the AGC start controller 506 already has the previous notice of the reception of the AGC preambles 105A and 105B issued by the signal decoder 505. Therefore, it supplies, based on symbol timing information from the symbol timing controller 502, the receiving units 302A to 302D with another AGC start command when the AGC preambles pass through the A/D converter 403 in FIG. 6. Upon receiving the AGC start command, the receiving units 302A to 302D again perform AGC using the AGC preambles 105A and 105B. As a result, the signals supplied from the transmission antennas Tx1 and Tx2, i.e., the signals transmitted through MIMO channels, can be appropriately adjusted and input to the respective A/D converters 403.

In the explanation described above, though a target value Z used for AGC at first time and a target value used for AGC at second time are set to the same value, different values may be set for the first time and the second time AGC. Thereby, it becomes possible for signals transmitted from a single antenna and also signals simultaneously transmitted from a plurality of antennas to be respectively conducted A/D conversion with high precision.

The FFT is used to decode the first signal field 103. The FFT is principally can not be started before the first signal field 103 is wholly received. Processing of the FFT and error correction decoding of the first signal field 103 are applied during reception of the second signal field 104.

Taking a current large-scale integration (LSI) technique into account, the timing to know a decoding result of the first signal field 103 is set in a period when a wireless receiving device has already been receiving the AGC preambles 105A and 105B. The timing to start the second time AGC is also set in a period when the wireless receiving device has already been receiving the AGC preambles 105A and 105B. At a lower section in FIG. 1, timing at which a wireless communication device starts the AGC is drawn. According to the drawing, aspects to conduct the first time AGC during the receiving of the short preamble sequence 101 and start the second time AGC during reception of the AGC preambles 105A and 105B are exhibited.

As shown in FIG. 1, if the power amplifier 205B for the antenna Tx2 is powered on at the first halves of the AGC preambles 105A and 105B, the output from the power amplifier 205B has already converged at the timing when the wireless receiving device decodes the first signal field 103, thereby, the power-on of the power amplifier 205B does not affect the second AGC. That is, it is not necessary for the power amplifier 205B to be powered on at a timing of transmission of the AGC preamble 105A, in other words, at a boundary between the second signal field 104 and the AGC preamble 105A (in the case of FIG. 1, powered on at the boundary), and it is required for the power 205B to be adjusted so that the distortion of the power amplifier 205B is converged until the wireless communication device will start the second AGC.

The second AGC start command may be issued after the second signal field 104 is decoded. However, in the embodiment, the second AGC start command is issued after the reserve bit 132 of the first signal field 103 is decoded. This enables a sufficient time to be held before AGC is actually started in response to the AGC start signal. Specifically, a margin can be imparted by the time required to decode the second signal field 104. Accordingly, compared to the case where the AGC start command is output after the second signal field 104 is decoded, the speed of decoding can be reduced and hence more inexpensive LSIs can be provided. Further, since the first AGC using the AGC preambles 105A and 105B can be performed within a longer time than in the case where the AGC start command is output after the second signal field 104 is decoded, high-quality signals can be received under the control using appropriate AGC values. In other words, gain control for the variable-gain amplifier 402 is performed again using the signal levels acquired after baseband signals corresponding to the AGC preambles 105A and 105B are A/D converted as shown in FIG. 5.

In this embodiment, the indicator of the IEEE802.11n is in the first signal field 103, however, the indicator can be implemented in the second signal filed 104. In this case, the indicator should be recognized by the receiver before the error correction, because the time from the indicator to the second AGC preamble is shorter than that when the indicator is in the first signal field 103. The second AGC start command will be issued after the recognizing the second signal field.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless transmitting device for use in communication with a wireless receiving device, comprising:
   a first antenna;
   at least one second antenna;
   a first and a second transmitter connected to the first antenna and the second antenna, respectively;
   a signal provide unit configured to provide a short preamble sequence, a first signal field and a second signal field to the first transmitter, and provide an automatic gain control (AGC) preamble sequence, and a long-preamble sequence to estimate data and a channel response, to the first transmitter and the second transmitter; and
   a controller to power on the first transmitter in time with transmission of the short preamble sequence from the first antenna and power on the second transmitter during transmission of the AGC preamble sequence.

2. A wireless transmitting device according to claim 1, wherein the short preamble sequence is used for a first AGC at the wireless receiving device, the AGC preamble sequence is used for a second AGC which is performed after the first AGC at the receiving device.

3. A wireless transmitting device according to claim 1, wherein the first signal field includes information for notifying transmission of the AGC preamble sequence.

4. A wireless transmitting device according to claim 1, wherein the first signal field includes information for notifying transmission of the AGC preamble sequence and the data by using the first antenna and the second antenna.

5. A wireless transmitting device according to claim 1, wherein the first and the second transmitter includes a first power amplifier and a second amplifier, respectively.

6. A wireless transmitting method comprising:
   transmitting a short preamble sequence, a first signal field and a second signal field from a first antenna by using a first transmitter;
   transmitting an automatic gain control (AGC) preamble sequence, a data and a long-preamble sequence to estimate a channel response, from the first antenna and the second antenna after transmission of the second signal field from the first antenna by using the first transmitter and a second transmitter;
   powering on the first transmitter in time with transmission of the short preamble sequence from the first antenna; and
   powering on the second transmitter during transmission of the AGC preamble sequence.

7. A wireless transmitting method according to claim 6, wherein the short preamble sequence is used for a first AGC at a wireless receiving device, the AGC preamble sequence is used for a second AGC which is performed after the first AGC at the receiving device.

8. A wireless transmitting method comprising:
   transmitting a short preamble sequence, a first signal field and a second signal field from a first antenna by using a first transmitter;
   transmitting an automatic gain control (AGC) preamble sequence, a data and a long-preamble sequence to estimate a channel response, from the first antenna and the second antenna after transmission of the second signal field from the first antenna by using the first transmitter and a second transmitter;
   powering on the first transmitter in time with transmission of the short preamble sequence from the first antenna; and
   powering on the second transmitter after transmission of the second signal field from the first antenna.

9. A wireless transmitting device for use in communication with a wireless receiving device comprising:
   a first antenna;
   at least one second antenna;
   a first and a second transmitter connected to the first antenna and the second antenna, respectively;
   a signal provide unit configured to provide a short preamble sequence transmitted at least one antenna and an automatic gain control (AGC) preamble sequence transmitted from the first antenna and the second antenna; and
   a controller to power on the first transmitter in time with transmission of the short preamble sequence from the first antenna and power on the second transmitter during transmission of the AGC preamble sequence.

* * * * *